Jan. 12, 1943.  E. MOREHOUSE  2,308,424
SECURING DEVICE
Filed May 23, 1942
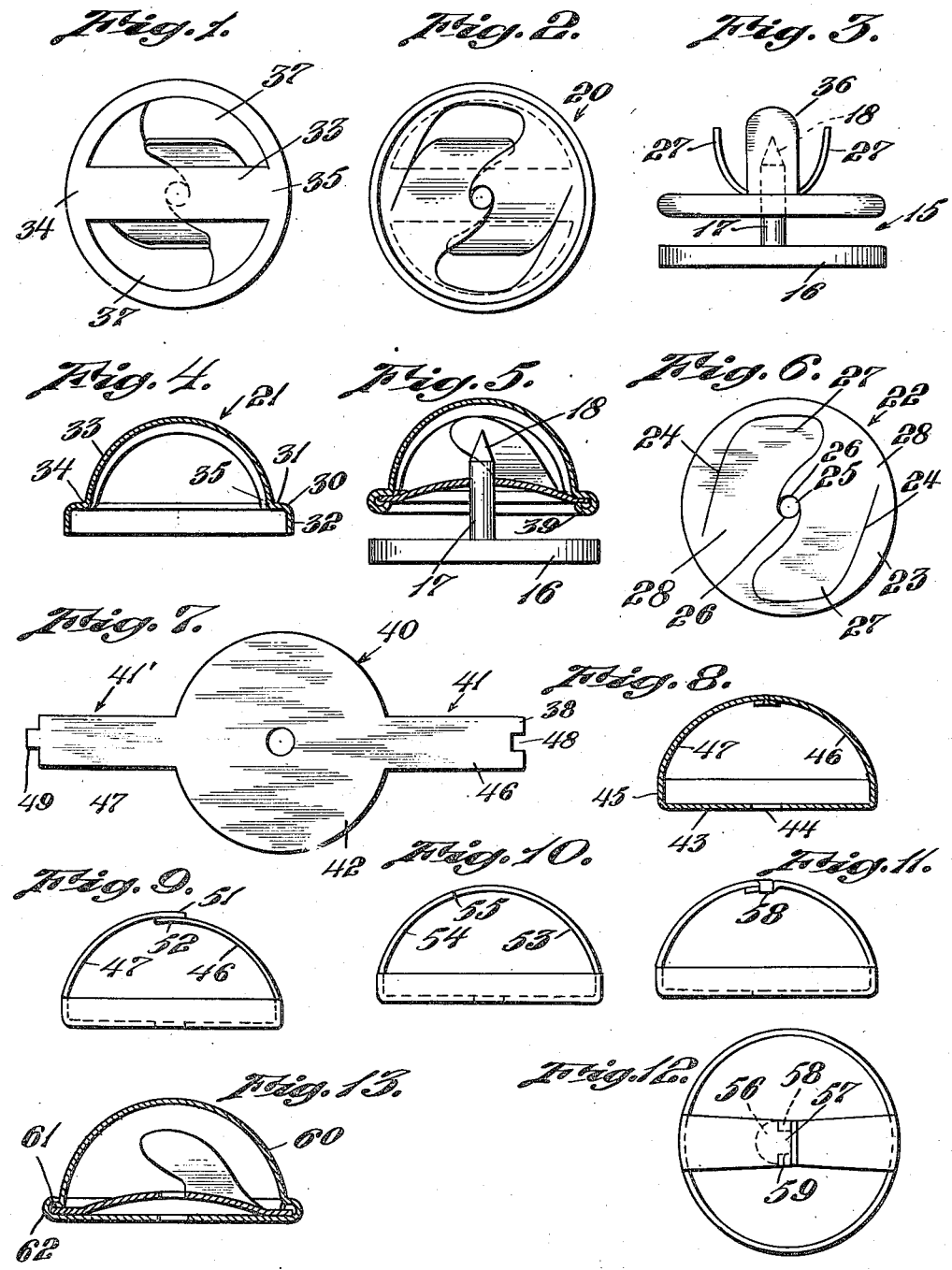
INVENTOR
Eugene Morehouse
BY Barlow & Barlow
ATTORNEYS Patented Jan. 12, 1943

2,308,424

UNITED STATES PATENT OFFICE 2,308,424

SECURING DEVICE

Eugene Morehouse, Providence, R. I., assignor to B. A. Ballou & Co., Inc., a corporation of Rhode Island Application May 23, 1942, Serial No. 444,225

6 Claims. (Cl. 24—217)

This invention relates to a securing device of a type which is especially adapted to grip and hold a shank or stud such for example as a rearwardly projecting shank of a button, and when used for this purpose it is frequently termed a "button back."

One of the objects of this invention is to provide a securing device of this character which will serve as a guard for the end of the shank or stud which it grips to prevent contact with the pointed end of the shank which might cause abrasion either to the hand of the user or to the fabric of clothing with which it might come in contact.

Another object of this invention is to simplify the construction of the securing device by reducing to a minimum the number of parts which are to be assembled together, thus requiring fewer handling operations in the assembly of the finished unit.

Another object of the invention is to direct and centralize the stud which is to be received and gripped so that it will be symmetrically positioned with respect to the securing device as a whole, and the clutch engagement will be substantially in a plane at right angles to the shank engaged.

With these and other objects in view, the invention consists of certain novel features of construction, as will be more fully described and particularly pointed out in the appended claims.

In the accompanying drawing:

Fig. 1 is a top plan view of the securing device;

Fig. 2 is a bottom view thereof;

Fig. 3 is a side elevation illustrating a shank as gripped by the securing device;

Fig. 4 is a sectional view through the guard portion of the securing device alone, before the clutch member is assembled with it;

Fig. 5 is a sectional view through the securing device as a whole and illustrating a shank and button in their assembled relation with the securing device;

Fig. 6 is a top plan view of the clutch plate before bent into final position;

Fig. 7 is a top plan view of a modified form of guard member blank cut out from a sheet of stock;

Fig. 8 is a sectional view through the guard member of the formation constructed from the blank shown in Fig. 7;

Figs. 9 and 10 are side elevations of guard members each of a modified construction from that heretofore referred to;

Fig. 11 is a side elevation of a guard member of a still different modification so far as the locking of the two meeting parts of the guard are concerned;

Fig. 12 is a top plan view of the structure of Fig. 11; and

Fig. 13 is a sectional view of a still different modified form of securing device.

In the use of buttons to be secured to the clothing, it is usual to provide some sort of a device to engage the shank which extends through the cloth, in order to prevent removal of the button and to securely mount the button on the clothing. The device is frequently referred to as a button back, and consists of some means which will clutch the shank and hold the body of the button back firmly secured thereto. Some of the simple assemblies leave the end of the shank exposed which, being pointed, may cause abrasion of other parts of the clothing which come in contact with it, or may scratch the flesh of the wearer in some instances. In overcoming this difficulty we have provided a securing device which although simple in construction will serve as a guard for the end of the shank upon which it is mounted, and thus when in assembled position no abrasion will occur.

In proceeding with the construction of this invention I require but two parts to be assembled together to provide the complete securing device. Each of these parts is formed of sheet stock and drawn up or bent into the required shape, with the parts of one rolled about the parts of the other to secure them together in final assembly of a single unit. Several different forms of the invention are illustrated, all embodying a common thought.

The member which is to be fastened is illustrated in Figs. 3 and 5 and is designated generally 15. It consists of a face plate 16 which may have any ornamental surface or configuration on the front face thereof, with a rearwardly extending shank 17 which may be pointed as at 18 so as to pierce the fabric of some garment to which the button 15 is desired to be secured.

The securing device, sometimes called a button back when in a securing relationship with a button, is designated generally 20 and consists of two parts, one of which, 21, may be referred to as the guard member, and the other part designated generally 22 may be referred to as the clutch member. These members are preferably each preformed into the shape and configuration desired and then are assembled together by rolling the parts of one about the parts of the other.

The clutch member designated generally 22 consists of a disc 23 blanked from sheet stock and slitted as shown by the lines 24 with a pierced central opening 25 having gripping edges 26 at opposite sides of this opening. Arms 27 are bent up along the slit lines 24 so as to rock about an area 28 where these arms are connected to the disc 23. When these arms 27 are moved toward each other the gripping edges 26 of the opening 25 are spread apart so as to enlarge the opening 25 and relieve it from engagement with a stud 17 which otherwise it would engage by the inherent resiliency of the stock. This clutch member is the same in all instances, although I have provided many variant forms of guards as will now be described.

The guard 21 shown in Fig. 4 in section consists of an annular rim 30 which may have an inwardly extending wall 31 and a flange 32 which is cylindrical and extends in a direction parallel to the axis of the shank member which is to be engaged, which relationship may be obtained by a drawing operation. A straplike guard 33 is arched upwardly and extends from a point 34 at one side of the rim to a point 35 at a diametrically opposite point of the rim. The amount of arching upwardly will be sufficient so as to receive the shank point beneath the arched strap and protect the point or prevent material or the hand of the person from coming in contact therewith. The straplike guard 33 may also be bent to provide a convex outer surface as at 36 (see Fig. 3) and a concave inner surface so that should the point contact this guard at a little off a right angular line to the plane of the wall 31 this concave surface will tend to direct the shank back to central position to dispose the shank symmetrically with reference to the securing device. The guard is of a sufficiently narrow dimension so as to leave openings 37 on either side of the guard into which the arms 27 of the clutch member may extend to be operated. The width of the guard member 33 is also of a sufficient amount so as to limit the movement of the arms 27 toward each other, that these will not become distorted to set the arms when being moved to released position.

To assemble the clutch part 22 and the guard member 21 it is merely necessary to place the disc 23 within the flanges 32 and against the under side of the wall 31, and then to roll inwardly the edges of the flange as seen at 39, Fig. 5 so as to bind the peripheral edge of the disc 23 firmly in engagement with the guard member 21. In such assembly the arms 27 bent upwardly as shown in Fig. 3 are disposed through the openings or at either side of the straplike guard 33 so that this straplike guard will be positioned centrally and symmetrically between the arms 27, see Fig. 3. By this arrangement the movement of the arms toward each other will be limited by their engagement with the straplike guard 33 and thus will prevent becoming set by excessive bending of these arms about their hinged point 28.

The securing device thus assembled may be positioned upon the shank 17 by passing the shank through the opening 25. The shank will be of a size larger than the normal diameter of the opening 25 so that the opening will be spread and the edges 26 moved apart as the shank is forced into the securing device. The inherent resiliency of the stock will tend at all times to cause the edges 26 to grip the shank 17 and thus hold the securing device firmly in position. To release the securing device it is merely necessary to grasp the arms 27 as shown in Fig. 3 and move them toward each other to move the gripping edges 26 away from each other and release the shank 17 which will permit removal of the securing device from the shank, and a withdrawal of the shank from an opening in the fabric through which it may be positioned.

The guard member, while retaining an annular rim and an arched strap, may take many different forms, although formed of a single piece of sheet stock cut into a desired shape of blank. For instance in Fig. 7 I have provided a blank of the shape there shown, the body part of which is designated generally 40 and the guard portion of which is designated generally 41, 41'. The central disc portion 42 is drawn up and, referring now more particularly to Fig. 8, provides a bottom wall 43 pierced as at 44 and provided with an upwardly extending flange 45 which may be drawn from the disc 42. The arms 46 and 47 will extend upwardly from the drawn flange 45 and will be arched over the bottom wall 43 and there suitably secured together, such for instance as by means of a notch 48 and a tongue 49, the tongue passing through the notch and beneath the arm 46 while the portions 38 at either side of this notch will extend beneath the stock of the arm 47 and thus form a lock between the ends of the arms in the arched shape of guard shown in Fig. 8. In Fig. 9 the structure is similar to that shown in Figs. 7 and 8 except that the arms instead of being locked as shown in Fig. 8 merely overlap so as to provide a portion 51 of the arm 47 extending over a portion 52 of the arm 46. In Fig. 10 the parts are similar except that the arm 53 is of longer extent than the arm 54 and there is abutting of these arms as at 55 at a point at one side of the center. In Figs. 11 and 12 a head 56 is provided on the end of one arm with a narrow neck portion 57, while fingers 58 on the other arm are bent through the notches 59 so as to lodge back of the shoulder formed by the head 56 and lock the parts in position. In Fig. 13 the guard member 60 is formed to extend wholly at one side of the rim and is provided with a lip 61 at its other end which extends beneath the flange 45 which is rolled inwardly as at 62 to secure the clutch plate member 23 in position. In each of the above instances of various forms of guard member, the function described more particularly in connection with the preferred form of guard member have been more fully set out.

I claim:

1. A securing device for a shank element comprising a body member having a rim, an upwardly arched guard of the same piece of stock as the rim and extending diametrically across the center of the rim with openings on either side of said guard and a clutch carried by said rim having a central opening for the reception of a shank element with a pointed end, said clutch having a pair of operable arms with one engageable through the opening at one side of the guard and the other engageable through the opening at the other side of the guard, said guard having a portion thereof extending over and covering the pointed end of said shank element when said device and shank element are in assembled relation providing protection against contact with said pointed end.

2. A securing device for a shank element comprising a body member having a rim, an upwardly arched straplike guard of the same piece of stock as the rim and extending diametrically across the center of the rim leaving openings on either side of said guard, and a sheet stock clutch carried by said rim having a central opening for the reception of a shank element with a pointed end, said clutch having a pair of operable arms with one extending into the opening at one side of the guard and the other extending into the opening at the other side of the guard, said guard having a portion thereof extending over and covering the pointed end of said shank element when said device and said shank are in assembled relation providing protection against contact with said pointed end.

3. A securing device for a shank element comprising a body member having a rim, an upwardly arched straplike guard of the same piece of stock as the rim and extending diametrically across the center of the rim leaving openings on either side of said guard, and a sheet stock clutch carried by said rim having a central opening for the reception of a shank element and provided with a pair of operable arms with one extending into the opening at one side of the guard and the other extending into the opening at the other side of the guard, said guard being located between said arms and of a width to be contacted by the arms and limit their movement toward each other.

4. A securing device for a shank element comprising a body member having a rim, an upwardly arched straplike guard of the same piece of stock as the rim and extending from diametrically opposite points of the rim to meet and form a joint while leaving openings on either side of said guard, and a clutch carried by said rim having a central opening for the reception of a shank element and provided with a pair of operable arms with one extending into the opening at one side of the guard and the other extending into the opening at the other side of the guard.

5. A securing device for a shank element comprising a body member having a rim, an upwardly arched straplike guard of the same piece of stock as the rim and extending from diametrically opposite points of the rim to meet and form a joint while leaving openings on either side of said guard, means to lock said meeting portions, and a clutch carried by said rim having a central opening for the reception of a shank element and provided with a pair of operable arms with one extending into the opening at one side of the guard and the other extending into the opening at the other side of the guard.

6. A securing device for a shank element comprising a body member having a rim, an upwardly arched straplike guard of the same piece of stock as the rim and extending from diametrically opposite points of the rim to meet and form a joint while leaving openings on either side of said guard, and a clutch carried by said rim having a central opening for the reception of a shank element and provided with a pair of operable arms with one extending into the opening at one side of the guard and the other extending into the opening at the other side of the guard, and a bottom wall across said rim having a perforation therein registering with the said central opening.

EUGENE MOREHOUSE.